United States Patent [19]

Hilsabeck

[11] 3,806,984
[45] Apr. 30, 1974

[54] PORTABLE ANIMAL-EXCREMENT COLLECTOR AND DISPOSAL APPARATUS

[76] Inventor: James R. Hilsabeck, 1600 Stetson Rd., Los Gatos, Calif. 95030

[22] Filed: Aug. 29, 1972

[21] Appl. No.: 284,659

[52] U.S. Cl............ 15/257.7, 15/257.6, 206/46 R, 229/62, 294/55
[51] Int. Cl......................... A471 13/52, B65d 33/16
[58] Field of Search............ 15/104.8, 257.1, 257.2, 15/257.3, 257.4, 257.5, 257.6, 257.7, 257.9; 248/99; 294/19 A, 55

[56] References Cited
UNITED STATES PATENTS

| | | | |
|---|---|---|---|
| 3,688,483 | 9/1972 | Hamilton | 294/55 X |
| 440,618 | 11/1890 | Byers | 15/257.4 |
| 569,829 | 10/1896 | Hunt | 15/257.4 |
| 398,330 | 2/1889 | Jacobs | 294/55 |
| 3,659,891 | 5/1972 | Pettenon et al. | 294/55 |
| 3,281,178 | 10/1966 | Fisher | 15/257.7 X |
| 1,668,053 | 5/1928 | Dawson | 248/99 X |
| 605,343 | 6/1898 | Ross | 150/4 |

FOREIGN PATENTS OR APPLICATIONS
550,857  1/1943  Great Britain .................... 229/14 B Primary Examiner—Daniel Blum
Attorney, Agent, or Firm—Schatzel & Hamrick

[57] ABSTRACT

A portable animal-excrement collector and disposal apparatus comprising a semi-rigid support frame defining an opening, the frame having a frontal member with an edge along one side for sliding along a planar surface beneath a volume of animal excrement to permit said opening to be in alignment with the excrement with the framing circumscribing said excrement; a handle integral with said frame and projecting from the frame at a position laterally off-set from said edge, the handle being adapted to be grasped by an individual to permit said individual to urge said edge along said planar surface and to manipulate said frame; and a pliable bag having an open end with the bag being adherently secured about its open end to said frame about the periphery of the opening of the frame.

6 Claims, 4 Drawing Figures

PORTABLE ANIMAL-EXCREMENT COLLECTOR AND DISPOSAL APPARATUS

BACKGROUND OF THE INVENTION

The present invention relates to a portable apparatus for collecting and disposing animal excrement dropped by an animal.

It is common for people to house, maintain and care for pets, such as dogs, at their residence. In highly populated areas, such as in cities, the excrement by the pets results in discontent to the caretaker and other individuals. The pets drop their excrement on sidewalks, streets, lawns, public parks and playgrounds causing unpleasant odors, unpleasant scenes and unsanitary conditions. As a result thereof, it is necessary that the excrements be collected and disposed. Frequently, the task of collection and disposal is left to street maintenance personnel, playground maintenance personnel and individual homeowners.

Frequently, the animal drops excrement while being exercised and accompanied by its owner or other attendant. Heretofore, when the animal drops excrement the attendant is placed in an embarassing position of having to ignore the excrement or in the alternative, carrying a very conspicuous implement for collecting the animal's excrements. The carrying of such a conspicuous implement is inconvenient to the animal owner as well as embarassing.

SUMMARY OF THE PRESENT INVENTION

The present invention provides a portable animal-excrement collecting and disposal apparatus which may be carried by the individual pet attendant while exercising the animal. The apparatus is adapted to be of small size and low weight. A plurality of devices may be carried in a concealed position in the attendant's pocket or purse prior to being used for collecting excrement dropped on a surface, e.g., street, side-walk, lawn, etc. The apparatus is further adapted such that when used by the individual to collect excrements, manipulation of the apparatus to make the collection requires only one hand of the individual. Assuming the animal is on a leash, this permits the individual to maintain a hold on the leash with one hand while simultaneously collecting the dropped excrement in the apparatus by manipulation of the other hand. After collection is made, the entire apparatus and collected excrement may be carried to a nearby waste disposal, e.g., trash can, for final disposal. The apparatus is adapted such that it may be manufactured at extremely low cost. It may further be comprised of biodegradable materials for pollution abatement purposes.

An exemplary embodiment of the present apparatus may include a semi-rigid support frame defining an opening. A pliable bag having an open end is engaged to the frame with the open end of the bag secured about and in alignment with the opening formed by the frame. The frame carries a frontal edge surface and an integral handle projecting from the frame at a position laterally offset from said edge. The handle is adapted to be grasped by the hand of an individual. In collecting the dropped excrement, the individual may urge the front edge of the frame beneath the volume of animal excrement until the excrement is in alignment with the opening established by the frame and the opening established by the bag. The frame is then lifted by the individual such that the excrement is trapped within the bag. The individual may then carry the entire apparatus by the handle and dispose of the apparatus in a waste disposal.

DESCRIPTION OF THE PREFERRED EMBODIMENT

Figure 1:
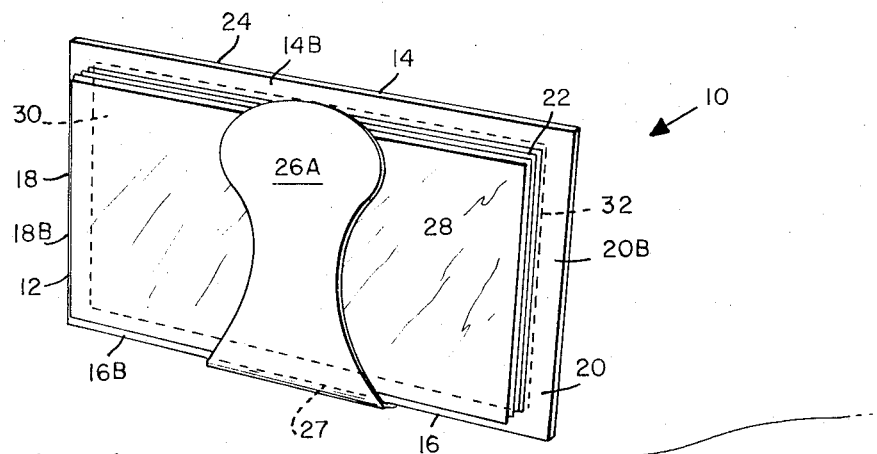
FIG. 1 is a perspective view of an embodiment of the apparatus of the present invention with said apparatus folded in position for storage prior to use.

The drawings depict an embodiment of the present invention and referred to by the general reference character 10. The embodiment 10 includes a semi-rigid rectangular-shaped planar support frame 12 having a frontal support member 14, a back support member 16 and a pair of lateral support members 18 and 20. The members 14, 16, 18 and 20 are arranged in a rectangular configuration to define an opening 22 about the interior periphery of the frame 12. The frontal member 14 carries a frontal edge 24. The frame 12 further includes a handle 26 integral with the back member 16. The handle 26 is engaged about the rear edge of the back member 16 to form a hinge such that the handle 26 may be pivoted relative to the back edge of the rear member 16. In the disclosed embodiment 10, the handle 26 may be pivoted approximately 360° about the back edge of the member 16. To facilitate establishment of the hinge action, a fold line 27 may be inscribed at the intersection of the back member 16 and the handle 26. The frame 12 may be comprised of a semi-rigid material which may take the form of cardboard, paste-board, or plastic.

As illustrated, the frontal member 14 has a top surface 14A and a bottom surface 14B; the rear member 16 has a top surface 16A and a bottom surface 16B; the lateral member 18 has a top surface 18A and a bottom surface 18B and the lateral member 20 has a top surface 20A and a bottom surface 20B. The handle 26 has a top surface 26A and a bottom surface 26B.

The frame 12 supports a pliable flexible bag 28. The bag 28 has an open end 30. The bag 28 is supported by the frame 12 such that the peripheral edge of the bag about the opening 30 is adherently secured about the top surfaces 14A, 16A, 18A and 20A of the frame 12. The bag 28 forms a lip 32 engaged to the top surfaces 14A, 16A, 18A and 20A. The bag 28 extends through the opening 22 formed by the frame 12 and projects from the bottom side of the frame 12 with the open end 30 in alignment with the opening 22 formed by the frame 12. The bag 28 is pliable and flexible so as to permit it to be packaged in an accordian-style so as to establish a substantially planar package about the bottom side of the framing 12 as illustrated in FIG. 1. The handle 26 is adapted so as to be pivoted along the fold line 27 about the outer edge of the rear member 16. When in a storage position prior to use for collecting excrement, as illustrated in FIG. 1, the handle 26 clamps over the package formed by the bag 28. In said storage position, the bottom surface 26B of the handle 28 engages the outer surface of the bag 28 to secure it in position and to retain a substantially planar, rectangular configuration.

Figure 2:
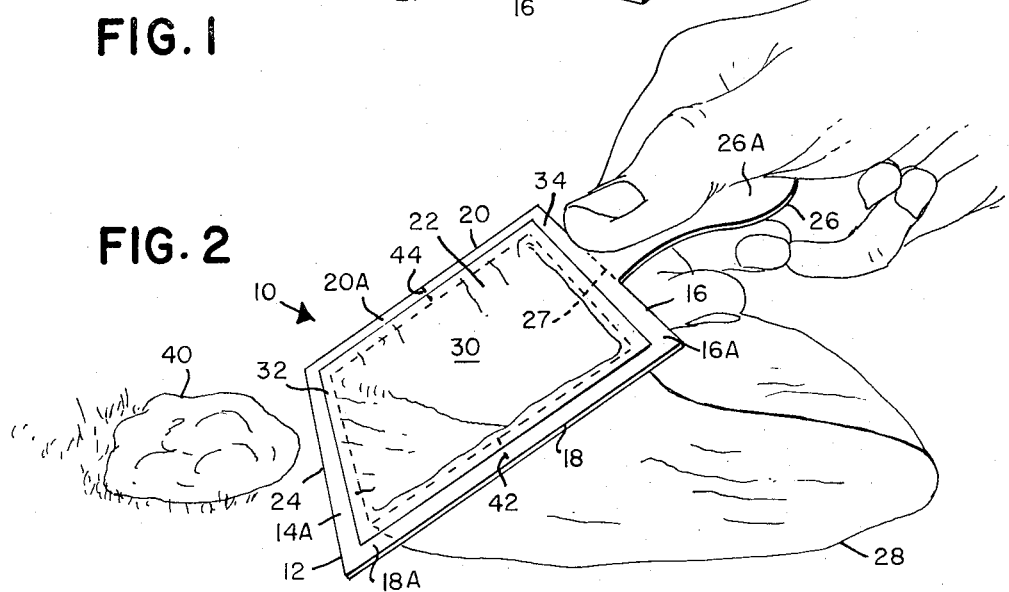
FIG. 2 is a perspective embodiment of FIG. 1 when said apparatus is grasped by an individual's hand and positioned for collecting a volume of animal excrement disposed on a planar surface.

When it is desired to utilize the apparatus 10 to collect a volume of excrement dropped by an animal, as illustrated by the volume of excrement 40 in FIG. 2, the handle 26 is pivoted approximately 180° about its pivot hinge 27 so as to assume an obtuse angle relative to the top surface 16A of the member 16. When in this collection position, the handle is in position for grasping by an individual and the bag 28 is free to extend from its stored position. In said collection position, the axis of the handle 26 is in substantial alignment with the plane of the frame 12 and the apparatus 10 may be manipulated by the individual to collect the volume of excrement 40. The individual, while grasping the handle 26, aligns the front edge 24 with the excrement 40. The handle 26 is pushed forward thereby urging the front edge 24 and front member 14 beneath the excrement until the excrement is aligned with the opening 22 and the open end 30 of the bag. Then the individual lifts the handle 26 vertically thereby entrapping the excrement 40 in the bag 28.

Figure 3:
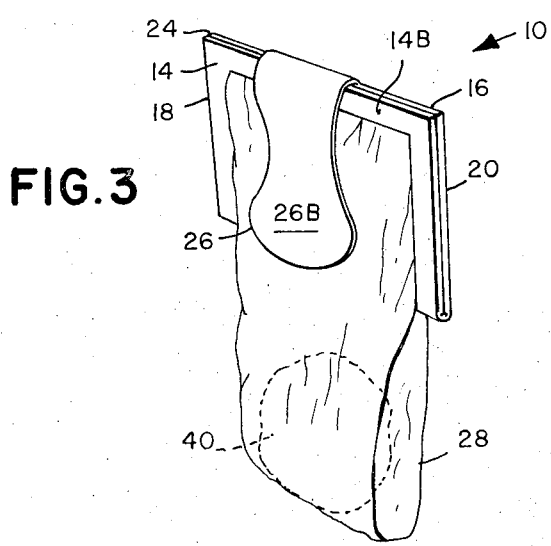
FIG. 3 is a perspective view of the apparatus of FIG. 1 after said apparatus has been used to collect the excrement and the apparatus has been sealed such that the entire apparatus and excrement may be carried for disposal.

The framing 12 is further adapted to be hinged at approximately mid-point of the lateral members 18 and 20. To permit such hinging, the top surfaces 18A and 20A are inscribed with a fold-line 42 and 44 respectively. Accordingly, once the excrement is trapped within the bag 28, the framing 12 may be folded along the inscribed fold-lines 42 and 44 so that the open end of the bag 30 is closed as illustrated in FIG. 3. With the frame 12 folded such that the top surface 14A of the member 14 and the top surfaces 16A of the member 16 are in adjacent abutment, the handle 26 may be further pivoted approximately 180° to overlap the frontal member 14 and secure the apparatus in a closed position. In said closed position, escapment of odors from the excrement are retarded. Once the excrement is entrapped, the individual may simply dispose of the entire apparatus in the nearest waste disposal or waste container.

The framing 12 and bag 28 may be comprised of bio-degradable material such that it decomposes after a period of time. Also, the bag 28 may be comprised of an opaque color such that an individual carrying the apparatus to a waste disposal after it has been utilized for collecting a volume of excrement, can avoid embarassment. Embodiments of the apparatus 10 may be made of a size which will permit it to be easily carried in the pocket or purse of an individual prior to being used for collecting excrement. The apparatus may be made of very lightweight materials such that the entire appartus weighs less than an ounce.

Figure 4:
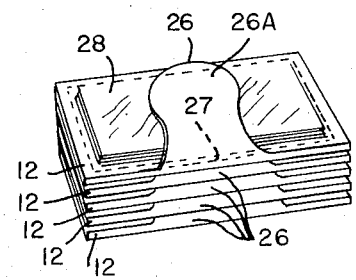
FIG. 4 is a perspective view of a plurality of the individual apparatus of the present invention prior to their use.

FIG. 4 illustrates a plurality of the apparatus 10 stored in a simple rectangular configuration. As illustrated by FIGS. 1 and 4, the apparatus 10, prior to use for collecting excrement, establishes a substantially planar structure. Thus a plurality of the devices may be packaged or stored in tandem one on top of the other. In such stored position, a plurality of the devices may be carried in the pocket or purse of an individual.

I claim:

1. A portable, animal-excrement collector and disposal apparatus comprising, in combination a support frame defining an opening, the frame having a frontal member with an edge along one side for sliding along a planar surface beneath a volume of animal excrement to permit said opening to be placed in alignment with the excrement;

a handle hinged to said frame and pivotable about the frame from a first position in which the handle is folded over the frame to a second position in which the handle projects from the frame along an axis in substantial alignment with the plane of the frame;

a pliable bag having an open end and adherently secured about said open end to said frame about the periphery of said opening of the frame, the bag being folded in a substantial planar configuration with said folded bag being positioned about one side of the frame in alignment with said defined opening, the handle in said first position holding said bag in said folded configuration.

2. The apparatus of claim 1 in which the frame is comprised of a first support member and a second support member with said first member being hinged to the second member to permit said members to be folded over one another about said hinge to a folded position to close said opening.

3. The apparatus of claim 2 in which the handle is hinged to the frame to permit the handle to be rotated from said first position to said second position and to a third position to support said frame members in said folded condition.

4. The apparatus of claim 2 in which the frame is comprised of a planar semi-rigid material with a planar handle integral therewith.

5. The apparatus of claim 3 in which the bag is comprised of an opaque, bio-degradable material and the framing is comprised of a bio-degradable material.

6. The apparatus of claim 5 in which the frame is comprised of a unitary member with an inscribed fold-line intermediate the first member and the second member to permit the first and second members to be folded relative to one another about said fold line.

\* \* \* \* \*